(12) United States Patent
Baba et al.

(10) Patent No.: US 8,883,347 B2
(45) Date of Patent: Nov. 11, 2014

(54) ALL SOLID STATE SECONDARY BATTERY

(75) Inventors: Mamoru Baba, Morioka (JP); Shoichi Iwaya, Niigata (JP); Hitoshi Masumura, Shibata (JP); Hiroshi Sato, Shibata (JP); Hiroshi Sasagawa, Shibata (JP); Noriyuki Sakai, Shibata (JP); Takayuki Fujita, Niigata (JP)

(73) Assignee: Namics Corporation, Niigata-Shi (JP)

( * ) Notice: Subject to any disclaimer, the term of this patent is extended or adjusted under 35 U.S.C. 154(b) by 1253 days.

(21) Appl. No.: 12/302,250

(22) PCT Filed: Feb. 13, 2007

(86) PCT No.: PCT/JP2007/052530
§ 371 (c)(1),
(2), (4) Date: Mar. 20, 2009

(87) PCT Pub. No.: WO2007/135790
PCT Pub. Date: Nov. 29, 2007

(65) Prior Publication Data
US 2009/0202912 A1 Aug. 13, 2009

(30) Foreign Application Priority Data
May 23, 2006 (JP) .................. PCT/JP2006/310230

(51) Int. Cl.
*H01M 4/13* (2010.01)
*H01M 10/04* (2006.01)
(Continued)

(52) U.S. Cl.
CPC ........ *H01M 10/0585* (2013.01); *H01M 10/044* (2013.01); *H01M 4/666* (2013.01);
(Continued)

(58) Field of Classification Search
CPC .......... H01M 10/044; H01M 10/0525; H01M 10/0562; H01M 10/0585; H01M 4/661; H01M 4/666; H01M 4/525; H01M 4/505; H01M 6/18; Y02E 60/122
USPC .......... 429/137, 304, 305, 218.1, 251, 231.95
See application file for complete search history.

(56) References Cited

U.S. PATENT DOCUMENTS 6,410,160 B1   6/2002 Landin et al.
(Continued)

FOREIGN PATENT DOCUMENTS

CN   1347166 A   5/2002
(Continued)

OTHER PUBLICATIONS

Extended European Search Report dated Oct. 31, 2011 for European Application No. 07714112.5.
(Continued)

*Primary Examiner* — Patrick Ryan
*Assistant Examiner* — Ben Lewis
(74) *Attorney, Agent, or Firm* — Birch, Stewart, Kolasch & Birch, LLP

(57) ABSTRACT

This is to provide an all solid state secondary battery which can be produced by an industrially employable method capable of mass-production and has excellent secondary battery characteristics.
This is an all solid state secondary battery containing a laminated material in which a positive-electrode unit and a negative-electrode unit are laminated alternately through an ion conductive inorganic-material layer, the positive-electrode unit has positive active material layers on both surfaces of a positive-electrode collector layer, the above-mentioned negative-electrode unit has negative active material layers on both surfaces of a negative-electrode collector layer, (A) at least one of the positive-electrode collector layer and the negative-electrode collector layer comprises a metal of either of Ag, Pd, Au and Pt, or an alloy containing either of Ag, Pd, Au and Pt, or a mixture containing two or more kinds selected from the metals and alloys, (B) each layer is in a sintered state, or (C) at least the starting material for the ion conductive inorganic material of the ion conductive inorganic-material layer is a calcined powder.

2 Claims, 3 Drawing Sheets

(51) Int. Cl.
  *H01M 4/66* (2006.01)
  *H01M 10/0525* (2010.01)
  *H01M 10/0562* (2010.01)
  *H01M 10/0585* (2010.01)

(52) U.S. Cl.
  CPC .......... *H01M 4/661* (2013.01); *H01M 10/0525* (2013.01); *Y02E 60/122* (2013.01); *H01M 10/0562* (2013.01)
  USPC ........ 429/218.1; 429/137; 429/304; 429/305; 429/231.95; 429/251

(56) References Cited

U.S. PATENT DOCUMENTS

| | | | |
|---|---|---|---|
| 6,881,514 | B2 | 4/2005 | Ahn et al. |
| 2002/0064712 | A1 | 5/2002 | Masahiro et al. |
| 2002/0160257 | A1 | 10/2002 | Hyang-Mok et al. |
| 2003/0013012 | A1 | 1/2003 | Soon-Ho et al. |
| 2003/0232248 | A1 | 12/2003 | Iwamoto et al. |
| 2004/0185336 | A1* | 9/2004 | Ito et al. ................. 429/152 |
| 2005/0170243 | A1 | 8/2005 | Kazunori et al. |
| 2005/0244716 | A1 | 11/2005 | Kazuya et al. |
| 2005/0285080 | A1 | 12/2005 | Tadashi et al. |
| 2006/0073388 | A1 | 4/2006 | Harada et al. |
| 2007/0259271 | A1 | 11/2007 | Nanno et al. |
| 2009/0202912 | A1 | 8/2009 | Baba et al. |

FOREIGN PATENT DOCUMENTS

| | | | |
|---|---|---|---|
| CN | 1363121 | A | 8/2002 |
| CN | 1363123 | A | 8/2002 |
| CN | 1652381 | A | 8/2005 |
| CN | 1674321 | A | 9/2005 |
| CN | 1677741 | A | 10/2005 |
| JP | 10-55824 | A | 2/1998 |
| JP | 10-284130 | A | 10/1998 |
| JP | 2000-200621 | A | 7/2000 |
| JP | 2001-015152 | A | 1/2001 |
| JP | 2001-068150 | A | 3/2001 |
| JP | 2001-93535 | A | 4/2001 |
| JP | 2001-102056 | A | 4/2001 |
| JP | 2001-126756 | A | 5/2001 |
| JP | 2001-155764 | A | 6/2001 |
| JP | 2001-210360 | A | 8/2001 |
| JP | 2001-243974 | A | 9/2001 |
| JP | 2002-42863 | A | 2/2002 |
| JP | 2002-373643 | A | 12/2002 |
| JP | 2003-523060 | A | 7/2003 |
| JP | 2004-213938 | A | 7/2004 |
| JP | 2004-273436 | A | 9/2004 |
| JP | 2006-107812 | A | 4/2006 |
| JP | 2006-261008 | A | 9/2006 |
| JP | 2007-005279 | A | 1/2007 |
| WO | 2006/064774 | A1 | 6/2006 |
| WO | WO 2007/135790 | A1 | 11/2007 |

OTHER PUBLICATIONS

Chinese Office Action in Chinese Application No. 201110056982.2 dated May 24, 2013 with English translation.
Japanese Office Action dated Jan. 22, 2013, for Japanese Patent Application No. 2008-516566, with partial English Translation.
Chinese Office Action in Chinese Application No. 201110056981.8 dated May 14, 2014 with English language translation.
Japanese Office Action (Notification of Reasons for Rejection) dated Mar. 4, 2014 in Japanese Application No. 2008-557926 with English language translation.
Machine translation for Hara et al., JP 2001-015152-A.
Machine translation for Kamimura et al., JP 2001-093535-A.

\* cited by examiner

ALL SOLID STATE SECONDARY BATTERY

TECHNICAL FIELD

The present invention relates to an all solid state secondary battery which contains a parallel type laminated material which is a product of en block burning (integrally sintered product).

BACKGROUND ART

Heretofore, as a secondary battery, optimization of a positive active material, a negative active material and an organic solvent electrolyte, etc., to be used has been carried out mainly in a non-aqueous electrolyte secondary battery (lithium ion secondary battery) using an organic solvent. A produced amount of the non-aqueous electrolyte secondary battery is markedly increasing accompanying with remarkable development of digital home appliances using the battery.

However, in the non-aqueous electrolyte secondary battery, there is pointed out in danger of catching fire since it uses inflammable organic solvent electrolyte, and the organic solvent electrolyte to be used decomposes by a reaction in the electrode to expand an outer can of the battery, and occasionally it causes leakage of the electrolyte.

Thus, an all solid state secondary battery which uses a solid electrolyte has attracted attention in place of the organic solvent electrolyte. The all solid state secondary battery does not structurally require a separator, and there is no fear of leakage of the electrolyte so that no outer can is required.

The all solid state secondary battery does not use any organic solvent electrolyte for its characteristics, a battery having no danger of catching fire can be constituted, and the solid electrolyte has ion selectivity, so that there is less side reaction and efficiency of the battery can be heightened, and as a result, a battery excellent in charge-discharge cycle characteristics can be expected.

For example, in Patent Literature 1, there is disclosed a wholly solid type substrate-mounted type secondary battery having a thin-film shaped electrode and a solid electrolyte without using any lithium metal piece. In this secondary battery, a small-sized and light-weighted lithium secondary battery is intended to be prepared by forming an electrode and an electrolyte with a sputtering method, electron beam deposition method, heat deposition method, etc., whereby the constituted product is made as thin as possible.

In Patent Literature 2, there is disclosed a laminated type thin-film solid lithium ion secondary battery in which a thin-film solid secondary battery cell comprising a positive active material, a solid electrolyte and a negative active material formed by a sputtering method is laminated two or more layers. This laminated type thin-film solid lithium ion secondary battery is laminating elements so as to connect them by a series or a parallel, so that it has been said to have effects that it can be applied to a high power appliance such as electric vehicles as a high-voltage or a high-current electric source, etc. However, thin-film wholly solid lithium ion secondary batteries disclosed in these prior art references are each produced by a sputtering method, etc., so that a film-formation rate of a thin-film of an electrode or a solid electrolyte is extremely slow. For example, for producing a battery constituted by a positive active material, a solid electrolyte and a negative active material with a thickness of 1.0 μm on a substrate, the film-formation time is 10 hours or longer. It is extremely difficult to employ such a method with a slow film-formation rate for Industrial purpose in the point of productivity, as well as in the point of manufacturing costs.

On the other hand, as an all solid state secondary battery prepared by other than the sputtering method, there have been proposed a material using a sintered body as mentioned in Patent Literature 3 and Patent Literature 4. However, the technique of Patent Literature 3 is characterized in that a positive active material layer, a solid electrolyte layer and a negative active material layer are laminated so that they are in symmetric interposing both surfaces of a flat-plate flat plate shaped collector, but such a manner of lamination is not extremely practical in industrial points of view and it is clear that it is not suitable for making a multi-layered structure. Also, the technique of Patent Literature 4 is to sinter a positive electrode material containing a binder, a solid electrolyte and a negative electrode material by micro wave heating, and then, to form a positive-electrode collector and a negative-electrode collector at the outside of the sintered material, which is a single layer battery structure, and cannot be made a multi-layered structure.

Patent Literature 1: JP 10-284130A
Patent Literature 2: JP 2002-42863A
Patent Literature 3: JP 2001-126756A
Patent Literature 4: JP 2001-210360A

DISCLOSURE OF THE INVENTION

Problems to be Solved by the Invention

Accordingly, it has been still desired to develop an all solid state secondary battery which can produce by an industrially employable method capable of mass-production and has excellent characteristics as a secondary battery.

Means to Solve the Problems

The present invention relates to an all solid state secondary battery which can be produced by an industrially employable method capable of mass-production and has excellent characteristics as a secondary battery, particularly to a wholly solid lithium ion secondary battery. More specifically, the present invention is an all solid state secondary battery containing a laminated material in which a positive-electrode unit and a negative-electrode unit are alternately laminated through an ion-conductive inorganic-material layer, wherein the positive-electrode unit has positive active material layers on both surfaces of a positive-electrode collector layer, the above-mentioned negative-electrode unit has negative active material layers on both surfaces of a negative-electrode collector layer, at least one of the positive-electrode collector layer and the negative-electrode collector layer comprises a metal of either of Ag, Pd, Au and Pt, or an alloy containing either of Ag, Pd, Au and Pt, or a mixture containing two or more kinds selected from the metals and alloys, and the laminated material is a product subjected to co-firing. Incidentally, the term "co-firing" means to carry out sintering after forming a laminated block by laminating materials of the respective layers constituting the laminated materials. It preferably relates to an all solid state secondary battery in which the co-firing is carried out at 900 to 1100° C. for 1 to 3 hours. Also, the present invention relates to an all solid state secondary battery which contains a laminated material in which a positive-electrode unit and a negative-electrode unit are alternately laminated through an ion-conductive inorganic-material layer, wherein the positive-electrode unit has positive active material layers on both surfaces of a positive-electrode collector layer, the negative-electrode unit has negative active material layers on both surfaces of a negative-electrode collector layer, and each layer is in a sintered state. In these wholly solid secondary batteries, an interface of the adjacent layers preferably has a sintered state.

Moreover, the present invention relates to an all solid state secondary battery containing a laminated material in which a positive-electrode unit and a negative-electrode unit are alternately laminated through an ion-conductive inorganic-material layer, wherein the positive-electrode unit has positive active material layers on both surfaces of a positive-electrode collector layer, the negative-electrode unit has negative active material layers on both surfaces of a negative-electrode collector layer, and at least a starting material for the ion-conductive inorganic-material of the ion-conductive inorganic-material layer is a calcined powder. In this all solid state secondary battery, the laminated material is preferably a product subjected to co-firing, and at least one of the positive-electrode collector layer and the negative-electrode collector layer preferably comprises any of a metal of Ag, Pd, Au and Pt, or an alloy containing any of Ag, Pd, Au and Pt, or a mixture of two or more kinds selected from these metals and alloys.

In the above-mentioned all solid state secondary battery, it is preferred that respective starting materials of the positive active material, the negative active material and the ion-conductive inorganic-material each of which constitutes the positive active material layer, the negative active material layer and the ion-conductive inorganic-material layer are calcined powders; when linear shrinkage rates after heating the calcined powders which are the starting material of the positive active material, the calcined powder which is the starting material of the negative active material and the calcined powder which is the starting material of the ion-conductive inorganic-material at a temperature of the co-firing are made a %, b % and c %, respectively, the difference between the maximum value and the minimum value thereof is within 6%; each of the positive-electrode collector layer and the negative-electrode collector layer is at least projected to different end surfaces of the laminated material; the laminated material contains two or more positive-electrode units and two or more negative-electrode units; it is a wholly solid lithium ion secondary battery; the positive active material layer, the negative active material layer and the ion-conductive inorganic-material layer each comprises a lithium compound; the all solid state secondary battery has a positive-electrode extracting electrode in contact with the positive-electrode collector layer and a negative-electrode extracting electrode in contact with the negative-electrode collector layer at different end surfaces of the laminated material, respectively; in an all solid state secondary battery in which an uppermost layer portion is a negative-electrode unit and a lowermost layer portion is a positive-electrode unit, the positive-electrode unit at the lowermost layer has a positive active material layer at one of the surfaces of the positive-electrode collector layer, and the positive active material layer is in contact with the ion-conductive inorganic-material layer, the negative-electrode unit at the uppermost layer portion has the negative active material layer at one of the surfaces of the negative-electrode collector layer, and the negative active material layer is in contact with the ion-conductive inorganic-material layer.

Also, the present invention relates to an all solid state secondary battery containing a laminated material in which a positive-electrode unit and a negative-electrode unit are alternately laminated through an ion-conductive inorganic-material layer, characterized in that the positive-electrode unit has positive active material layers on both surfaces of a positive-electrode collector layer, where the positive active material layer comprises a lithium compound selected from the group consisting of $LiCoO_2$, $LiNiO_2$, $LiMnO_2$, $LiMn_2O_4$, $LiCuO_2$, $LiCoVO_4$, $LiMnCoO_4$, $LiCoPO_4$ and $LiFePO_4$; the negative-electrode unit has negative active material layers on both surfaces of the negative-electrode collector layer, where the negative active material layer comprises a lithium compound selected from the group consisting of $Li_{4/3}Ti_{5/3}O_4$, $LiTiO_2$ and $LiM1_sM2_tO_u$, (M1 and M2 are transition metals, and s, t and u are optional positive numbers); the ion-conductive inorganic-material layer comprises a lithium compound selected from the group consisting of $Li_{3.25}Al_{0.25}SiO_4$, $Li_3PO_4$ and $LiP_xSi_yO_z$ (wherein x, y and z are optional positive numbers); each of the positive-electrode collector layer and the negative-electrode collector layer is at least projected to different end surfaces of the laminated material; the laminated material contains two or more positive-electrode units and two or more negative-electrode units, and the laminated material is an co-firing product.

The above-mentioned all solid state secondary battery is preferably characterized in that each of the positive-electrode collector layer and the negative-electrode collector layer is at least projected to the different end surfaces of the laminated material; the positive active material layer comprises $LiMnO_4$, the negative active material layer comprises $Li_{4/3}Ti_{5/3}O_4$, and the ion-conductive inorganic-material layer comprises $Li_{3.5}P_{0.5}Si_{0.5}O_4$; the starting material of the positive active material is calcined powder, the starting material of the negative active material is calcined powder and the starting material of the ion-conductive inorganic-material is calcined powder; the starting material of the positive active material is calcined powder at 700 to 800° C., the starting material of the negative active material is calcined powder at 700 to 800° C. and the starting material of the ion-conductive inorganic-material is calcined powder at 900 to 1000° C., and, when linear shrinkage rates after heating the calcined powders which are the starting material of the positive active material, the calcined powder which is the starting material of the negative active material and the calcined powder which is the starting material of the ion-conductive inorganic-material at a temperature of the co-firing are made a %, b % and c %, respectively, the difference between the maximum value and the minimum value thereof is within 6%; at least one of the positive-electrode collector layer and the negative-electrode collector layer comprises any of a metal of Ag, Pd, Au and Pt, or an alloy containing any of Ag, Pd, Au and Pt, or a mixture of two or more kinds selected from these metals and alloys; each of a positive-electrode extracting electrode in contact with the positive-electrode collector layer and a negative-electrode extracting electrode in contact with the negative-electrode collector layer is provided at different end surfaces of the laminated material; in an all solid state secondary battery in which an uppermost layer portion is a negative-electrode unit and a lowermost layer portion is a positive-electrode unit, the positive-electrode unit at the lowermost layer portion has a positive active material layer only at one surface of the positive-electrode collector layer, and the positive active material layer is in contact with the ion-conductive inorganic-material layer, the negative-electrode unit at the uppermost layer portion has a negative active material layer only at one surface of the negative-electrode collector layer, and the negative active material layer is in contact with the ion-conductive inorganic-material layer; in an all solid state secondary battery in which an uppermost layer portion is a negative-electrode unit and a lowermost layer portion is a positive-electrode unit, the positive-electrode unit at the lowermost layer portion has a protective layer on a positive-electrode collector layer which is not in contact with the ion-conductive active-material layer, and the negative-electrode unit at the uppermost layer portion has a protective layer on a negative-electrode collector layer which is not in contact with the ion-conductive active-material layer.

Moreover, the present invention relates to a process for preparing an all solid state secondary battery comprising the following steps (1) to (4): (1) a step of preparing a positive-electrode paste containing calcined powder of a positive active material, a negative-electrode paste containing calcined powder of a negative active material, an ion-conductive inorganic-material paste containing calcined powder of an ion-conductive inorganic-material, a positive-electrode collector paste containing powder of a positive-electrode collector and a negative-electrode collector paste containing powder of a negative-electrode collector; (2) a step of preparing a positive-electrode unit by coating pastes on a substrate in the order of the ion-conductive inorganic-material paste, the positive-electrode paste, the positive-electrode collector paste and the positive-electrode paste, after drying them depending on necessity, and peeling the substrate, and preparing a negative-electrode unit by coating pastes on a substrate in the order of the ion-conductive inorganic-material paste, the negative-electrode paste, the negative-electrode collector paste and the negative-electrode paste, after drying them depending on necessity, and peeling the substrate; (3) a step of obtaining a laminated block by alternately laminating the positive-electrode unit and the negative-electrode unit so that the positive-electrode paste layer of the positive-electrode unit and the negative-electrode paste layer of the negative-electrode unit are not in contact with each other, and the positive-electrode collector paste layer and the negative-electrode collector paste layer are each projected to different portions of the end surfaces of the laminated block, preferably by molding under pressure; and (4) a step of obtaining a laminated material by subjecting the laminated block to co-firing; and a process for preparing an all solid state secondary battery comprising the following steps (1') to (4'): (1') a step of preparing calcined powder of a positive active material, calcined powder of a negative active material and calcined powder of an ion-conductive inorganic-material by making a calcinations temperature of the ion-conductive inorganic-material higher than calcination temperatures of the positive active material and the negative active material; (2') a step of preparing a positive-electrode paste containing calcined powder of a positive active material, a negative-electrode paste containing calcined powder of a negative active material, an ion-conductive inorganic-material paste containing calcined powder of an ion-conductive inorganic-material, a positive-electrode collector paste containing powder of a positive-electrode collector and a negative-electrode collector paste containing powder of a negative-electrode collector; (3') a step of obtaining a laminated block by coating pastes on a substrate in the order of the positive-electrode paste, the positive-electrode collector paste, the positive-electrode paste, the ion-conductive inorganic-material paste, the negative-electrode paste, the negative-electrode collector paste, the negative-electrode paste and the ion-conductive inorganic-material paste, and so as to project a positive-electrode collector paste layer and a negative-electrode collector paste layer to different portions of the end surfaces of the laminated block, and drying the block, if necessary; and (4') a step of obtaining a laminated material by peeling the substrate from the laminated block, if necessary, and subjecting to co-firing.

Effects of the Invention

The all solid state secondary battery of the present invention can be prepared by a method which is simple and easy, and without requiring a long time, and excellent in the point of efficiency, so that it has excellent effects that it can be employed for industrial purpose and a manufacturing cost is in expensive. In addition, in the all solid state secondary battery of the present invention, a laminated material in which a positive-electrode unit and a negative-electrode unit are alternately laminated through an ion-conductive inorganic-material has an effect of excellent in charge-discharge characteristics of a battery. In particular, by co-firing, a laminated material which is a sintered material having good solid-solid surface connection between respective layers can be obtained and a battery having small internal resistance and good energy efficiency can be obtained.

EXPLANATION OF REFERENCE NUMERALS

Figure 1:
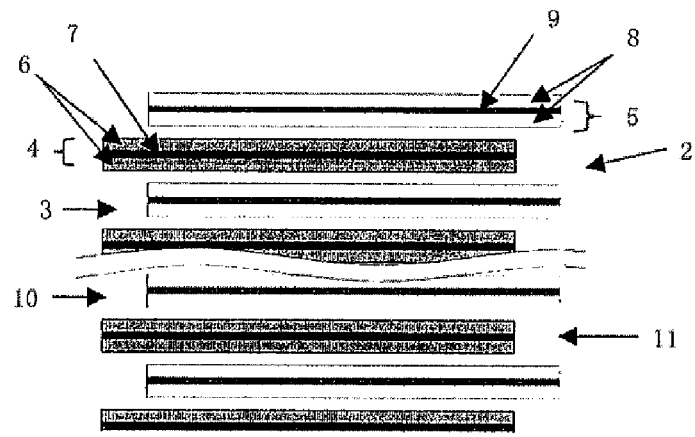
FIG. 1 It is a drawing showing a laminated material with a basic structure of the all solid state secondary battery of the present invention.

1 All solid state secondary battery
2 Laminated material
3 Ion-conductive inorganic-material layer
4 Positive-electrode unit
5 Negative-electrode unit
6 Positive active material layer
7 Positive-electrode collector layer
8 Negative active material layer
9 Negative-electrode collector layer
10 One end surface of laminated material
11 Other end surface of laminated material
12 Positive-electrode extracting electrode
13 Negative-electrode extracting electrode
23 Ion-conductive inorganic-material layer
24 Positive-electrode unit at lowermost layer portion
25 Negative-electrode unit at uppermost layer portion
26 Positive active material layer
27 Positive-electrode collector layer
28 Negative active material layer
29 Negative-electrode collector layer
34 Positive-electrode unit at lowermost layer portion
35 Negative-electrode unit at uppermost layer portion
36 Positive active material layer
38 Negative active material layer
40 Protective layer

BEST MODE TO CARRY OUT THE INVENTION

In FIG. 1, most basic structure of a laminated material constituting an all solid state secondary battery of the present invention is shown. The laminated material 2 is so constituted that a positive-electrode unit 4 and a negative-electrode unit 5 are alternately laminated through an ion-conductive inorganic-material layer 3. The positive-electrode unit 4 has positive active material layers 6 on both surfaces of a positive-electrode collector layer 7, and the negative-electrode unit 5 has negative active material layers 8 on both surfaces of a negative-electrode collector layer 9.

Also, it is preferred that the positive-electrode collector layer 7 is projected to an end surface 10 of the laminated material 2, and the negative-electrode collector layer 9 is projected to the other end surface 11 of the laminated material 2. That is, it is preferred that the positive-electrode collector layer is projected to one end surface 10 of the laminated material but not projected to the other end surface 11 whereby it is not exposed. Similarly, it is preferred that the negative-electrode collector layer is projected to the other end surface 11 but not projected to one end surface 10 whereby it is not exposed. Provided that in these preferred embodiments, the positive-electrode collector layer and the negative-electrode collector layer may be sufficient to be at least projected to different portions of the end surfaces of the laminated material, and the positive-electrode collector layer and the negative-electrode collector layer may be projected to the different portions on the same end surface. From the point of manufacturing efficiency, it is preferred that the positive-electrode collector layer and the negative-electrode collector layer are at least projected at different end surfaces of the laminated material. In this case, the positive-electrode collector layer and the negative-electrode collector layer may be projected to a plural number of end surfaces. For example, it may be so constituted that the laminated material has at least one end surface at which only the positive-electrode collector layer is projected and at least one end surface at which only the negative-electrode collector layer is projected, and at the other end surface, at least one of or both of the positive-electrode collector layer and the negative-electrode collector layer may be projected, or both of which may not be projected.

In the all solid state secondary battery, the laminated material 2 is a product subjected to co-firing. When a number of the negative-electrode unit and the positive-electrode unit in the laminated material is each one or more, an all solid state secondary battery can be formed. Numbers of the negative-electrode unit and the positive-electrode unit may vary with a wide range based on a capacity or current value of the required all solid state secondary battery, and the merits of the present invention can be obtained in the case of each two or more, in particular, in the case of each three or more, and, for example, the merits are remarkable when it takes a multi-layered structure of 10 to 500 units.

Figure 2:
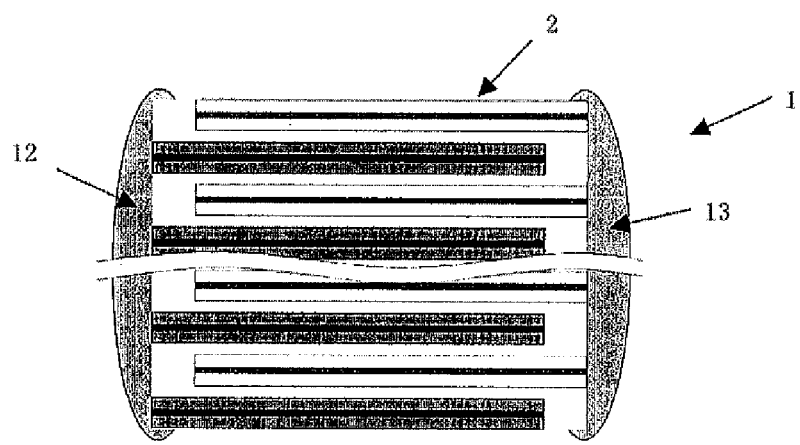
FIG. 2 It is a drawing showing a structure of the all solid state secondary battery having an extracting electrode of the present invention.

Also, as shown in FIG. 2, in the all solid state secondary battery 1, it is preferred that a positive-electrode extracting electrode 12 which is in contact with a positive-electrode collector layer 7 is provided at one end surface 10 of the laminated material 2, and a negative-electrode extracting electrode 13 which is in contact with a negative-electrode collector layer 9 is provided at the other end surface 11 of the laminated material 2.

Figure 3:
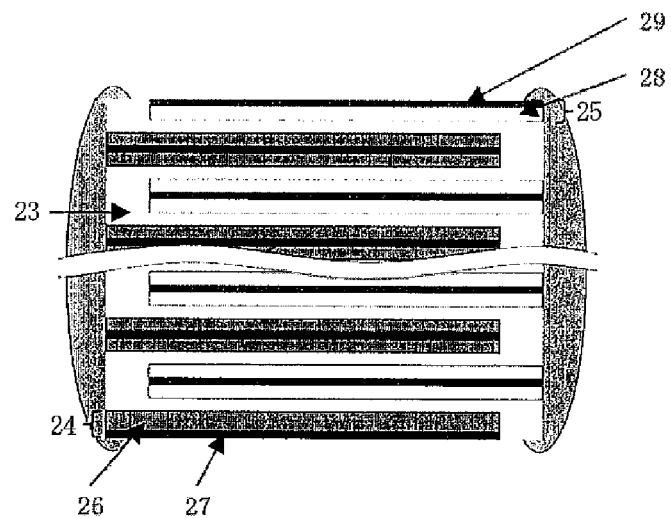
FIG. 3 It is a drawing showing a structure of other embodiment of the all solid state secondary battery of the present invention.

Moreover, as shown in FIG. 3, in an all solid state secondary battery wherein the uppermost layer portion is a negative-electrode unit 25, and the lowermost layer portion is positive-electrode unit 24, it is preferred that the positive-electrode unit 24 at the lowermost layer portion has a positive active material layer 26 on one surface of a positive-electrode collector layer 27, and the positive active material layer 26 is contacted to an ion-conductive inorganic-material layer 23, the negative-electrode unit 25 at an uppermost layer portion has a negative active material layer 28 on one surface of a negative-electrode collector layer 29, and the negative active material layer 28 is contacted to the ion-conductive inorganic-material layer 23. In the present specification, the terms of the uppermost layer portion and the lowermost layer portion merely show a relative positional relationship.

Figure 4:
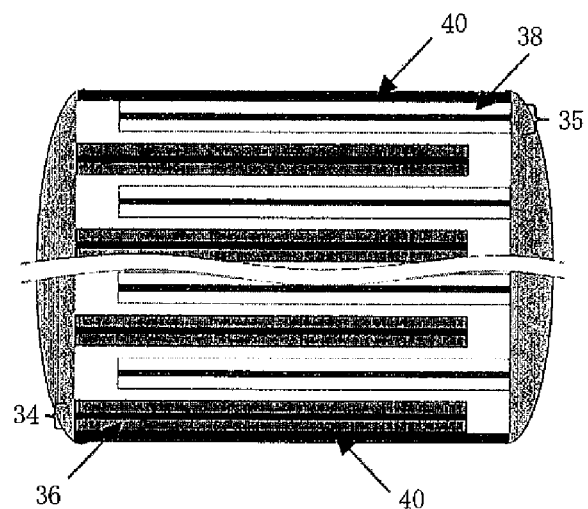
FIG. 4 It is a drawing showing a structure of still other embodiment of the all solid state secondary battery of the present invention the present invention.

Also, in order to prevent from inadvertent electric short-circuit of an all solid state secondary battery with outside, and to constitute an all solid state secondary battery having high reliability by preventing from an effect from humid in outer circumstance, etc., it is preferred that a protective layer is provided either at the upper end or bottom end of the laminated material or preferably at the both ends. For example, as shown in FIG. 4, it can be made in an all solid state secondary battery wherein an uppermost layer portion is a negative-electrode unit 35 and a lowermost layer portion is a positive-electrode unit 34, the all solid state secondary battery comprises the positive-electrode unit at the lowermost layer portion 34 having a protective layer 40 on a positive active material layer 36 which is not in contact with an ion-conductive inorganic-material layer, and the negative-electrode unit 35 at the uppermost layer portion having a protective layer 40 on a negative active material layer 38 which is not in contact with an ion-conductive inorganic-material layer. In the present specification, the terms upper end and lower end merely mean relative positional relationship.

Incidentally, as a structure of the all solid state secondary battery, it is possible to employ a parallel type two-layer cell structure which is constituted by two layers of cells at up and down and a length of each cell being changed as shown in FIG. 2 of Patent Literature 2. This structure does not require any insulating layer in a general multi-layered cell so that preparation steps for the manufacture are expected to be simplified. On the other hand, it is necessary to change a length of a cell unit, to laminate cells asymmetrically by interposing a common electrode, and to connect each cell by wiring, etc., so that it is considered to have a limit in the point of productivity. On the other hand, in the structure of the all solid state secondary battery of the present invention, the above-mentioned requirements are not present and it is excellent in productivity.

The ion-conductive inorganic-material layer, the positive active material layer, the negative active material layer, the positive-electrode collector layer, the negative-electrode collector layer and the occasionally provided protective layer constituting the all solid state secondary battery of the present invention are as follows.

The ion-conductive inorganic-material layer preferably comprises a lithium compound selected from the group consisting of $Li_{3.25}Al_{0.25}SiO_4$, $Li_3PO_4$ and $LiP_xSi_yO_z$, (wherein x, y, z are optional positive numbers), but it is not limited by these. $Li_{3.5}P_{0.5}Si_{0.5}O_4$ is more preferred.

The positive active material layer preferably comprises a lithium compound selected from the group consisting of $LiCoO_2$, $LiNiO_2$, $LiMnO_2$, $LiMn_2O_4$, $LiCuO_2$, $LiCoVO_4$, $LiMnCoO_4$, $LiCoPO_4$ and $LiFePO_4$, but it is not limited by these. $LiCoO_2$, $LiMnO_2$ or $LiMn_2O_4$ is more preferred.

The negative active material layer preferably comprises a lithium compound selected from the group consisting of $Li_{4/3}Ti_{5/3}O_4$, $LiTiO_2$ and $LiM1_sM2_tO_u$, (M1 and M2 are transition metals, and s, t and u are optional positive numbers), but it is not limited by these. $Li_{4/3}Ti_{5/3}O_4$ or $LiTiO_2$ is more preferred.

Either of the positive-electrode collector layer and the negative-electrode collector layer can be any of a metal of Ag, Pd, Au and Pt. Or else, it may comprise an alloy containing any of Ag, Pd, Au and Pt. In the case of the alloy, an alloy comprising two or more kinds selected from Ag, Pd, Au and Pt is preferred, and for example, an Ag/Pd alloy. These metals and alloys may be single, or a mixture of two or more kinds. The positive-electrode collector layer and the negative-electrode collector layer may be the same material or different from each other, and preferably the same material in the point of manufacturing efficiency. In particular, in an alloy or a mixed powder comprising Ag and Pd, a melting point can be continuously and optionally changed from a melting point of silver (962° C.) to a melting point of palladium (1550° C.) according to a mixing ratio, so that a melting point can be adjusted depending on a co-firing temperature. Moreover, electron conductivity is high so that there is an advantage that an internal resistance of a battery can be controlled to a minimum value.

An optionally provided protective layer can be a lithium compound mentioned with respect to the ion-conductive inorganic-material layer, but it is not limited by these, and can be various kinds of insulating materials. In the point of manufacturing efficiency, it preferably comprises the same material as that of the ion-conductive inorganic-material layer.

In the all solid state secondary battery of the present invention, the laminated material can be prepared by using a pasted material of the respective materials for forming the positive active material layer, the negative active material layer, the ion-conductive inorganic-material layer, the positive-electrode collector layer, the negative-electrode collector layer and the optionally provided protective layer.

Here, starting materials of the positive active material layer, the negative active material layer and the ion-conductive inorganic-material layer to be used for making pastes, powders in which inorganic salts, etc., which are starting materials thereof have been calcined can be used. In the point of developing respective functions sufficiently after co-firing by proceeding chemical reactions of the starting materials according to calcination, calcination temperatures with regard to the positive active material, the negative active material and the ion-conductive inorganic-material are each preferably 700° C. or higher.

Incidentally, when each layer is formed by using a calcined positive active material, negative active material and ion-conductive inorganic-material, each substance is tend to be shrunk after the co-firing. In order to obtain good battery characteristics by controlling degrees of shrinkages of the positive active material, the negative active material and the ion-conductive inorganic-material after the co-firing, and controlling occurrence of bending or peeling due to crack or strain, it is preferred that the ion-conductive inorganic-material is calcined at a higher temperature than that of the positive active material and negative active material. More specifically, a positive active material calcined at 700 to 800° C., a negative active material calcined at 700 to 800° C., and an ion-conductive inorganic-material calcined at 900 to 1000° C., preferably at 950 to 1000° C. can be used in combination.

Moreover, with regard to the positive active material, the negative active material and the ion-conductive inorganic-material, when linear shrinkage rates thereof at the time of heating to the temperature of the co-firing are made a %, b % and c %, respectively, it is preferred that the calcined positive active material, negative active material and ion-conductive inorganic-material are used so that a difference between the maximum value and the minimum value is within 6% by controlling the calcination temperatures. According to this, good battery characteristics can be obtained by controlling occurrence of bending or peeling due to crack or strain.

Here, the linear shrinkage rate is a value measured by the following.

(1) Powder which is an object to be measured is pressed with 0.5 t/cm$^2$ [49 MPa] to prepare a test piece with a thickness of 0.8 to 1.2 mm, and cut to prepare a test piece having a length of 1.5 mm, a width of 1.5 mm, and a thickness of 0.8 to 1.2 mm.

(2) By using a thermal analyzer (manufactured by Mac-Science Co., Ltd.), change in thickness after heating to a predetermined temperature was measured while applying a load of 0.44 g/mm$^2$ to the test piece according to the thermo-mechanical analysis method.

(3) A value in which the measured value is substituted to the following equation is made a linear shrinkage rate.

$$\text{Linear shrinkage rate } [\%] = \frac{\text{Initial thickness} - \text{Thickness after heating to predetermined temperature}}{\text{Initial thickness}} \times 100$$

For example, positive active materials calcined at 700 to 800° C. such as LiCoO$_2$, LiNiO$_2$, LiMnO$_2$, LiMn$_2$O$_4$, LiCuO$_2$, LiCoVO$_4$, LiMnCoO4, LiCoPO$_4$, LiFePO$_4$, etc., negative active materials calcined at 700 to 800° C. such as Li$_{4/3}$Ti$_{5/3}$O$_4$, LiTiO$_2$, LiM1$_s$M2$_t$O$_u$ (M1 and M2 are transition metals, and s, t and u are optional positive numbers), etc., can be used in combination with ion-conductive inorganic-materials calcined at 900 to 1000° C. such as Li$_{3.25}$Al$_{0.25}$SiO$_4$, Li$_3$PO$_4$, LiP$_x$Si$_y$O$_z$, (wherein x, y and z are optional positive numbers), etc., such that a difference of the maximum value and the minimum value of the linear shrinkage rates a %, b % and c % becomes within 6%.

A method of making a paste of each material is not particularly limited, and, for example, powder of the above-mentioned respective materials is mixed with a vehicle comprising an organic solvent and a binder to obtain a paste. For example, a collector paste can be prepared by mixing a vehicle with a mixture of metal powders of Ag and Pd, synthetic powder of Ag/Pd by a co-precipitation method or powder of an Ag/Pd alloy.

A preparation method of a laminated material in an all solid state secondary battery of the present invention using pastes of the respective materials is, for example, as follows. The pastes are coated on a substrate with a desired order, after drying them depending on necessity, the substrate is peeled off to obtain a laminated block. Then, the laminated block is subjected to co-firing whereby a laminated material can be obtained.

Also, with respective parts of a laminated material, each paste is coated in the order corresponding to the part on a substrate, and after drying them depending on necessity, a material in which the substrate is peeled off is prepared, and they are laminated and molded under pressure, and subjected to co-firing to prepare a material. More specifically, pastes are coated successively on the substrate so as to form an ion-conductive inorganic-material and a positive-electrode unit, and after drying them depending on necessity, the substrate is peeled off to prepare a positive-electrode unit. On the other hand, pastes are coated successively on the substrate so as to form an ion-conductive inorganic-material and a negative-electrode unit, and after drying them depending on necessity, the substrate is peeled off to prepare a negative-electrode unit. These positive-electrode unit and negative-electrode unit are alternately laminated, preferably molded under pressure to obtain a laminated block, and this is subjected to co-firing to obtain a laminated material. In either of the methods, it is preferred that coating of the pastes or lamination of the units is carried out so that the positive-electrode collector paste layer and the negative-electrode collector paste layer are at least projected to different portions of the end surfaces of the laminated block. Also, if desired, to form a protective layer at either one of the upper end and the lower end of the laminated material block or at the both ends, the co-firing can be carried out, for example, after providing an ion-conductive inorganic-material paste layer. Incidentally, a method of coating the paste is not particularly limited, and conventionally known methods such as screen printing, transfer, doctor-blade, etc., can be employed. It is preferred that coating of pastes or lamination of the units is carried out so that the positive-electrode collector paste layer and the negative-electrode collector paste layer are at least projected to different end surfaces of the laminated block.

More specifically, there may be mentioned a process for preparing an all solid state secondary battery containing the following steps (1) to (4):

(1) a step of preparing a positive-electrode paste containing calcined powder of a positive active material, a negative-electrode paste containing calcined powder of a negative active material, an ion-conductive inorganic-material paste containing calcined powder of an ion-conductive inorganic-material, a positive-electrode collector paste containing powder of a positive-electrode collector and a negative-electrode collector paste containing powder of a negative-electrode collector;

(2) a step of preparing a positive-electrode unit by coating pastes on a substrate in the order of the ion-conductive inorganic-material paste, the positive-electrode paste, the positive-electrode collector paste and the positive-electrode paste, and after drying them depending on necessity, peeling the substrate, and preparing a negative-electrode unit by coating pastes on a substrate in the order of the ion-conductive inorganic-material paste, the negative-electrode paste, the negative-electrode collector paste and the negative-electrode paste, and after drying them depending on necessity, peeling the substrate;

(3) a step of obtaining a laminated block by alternately laminating the positive-electrode unit and the negative-electrode unit so that the positive-electrode paste layer of the positive-electrode unit and the negative-electrode paste layer of the negative-electrode unit are not in contact with each other, and the positive-electrode collector paste layer and the negative-electrode collector paste layer are each projected to different portions of the end surfaces of the laminated block, preferably by molding under pressure; and (4) a step of obtaining a laminated material by subjecting the laminated block to co-firing. It is preferred that it is alternately laminated so that the positive-electrode collector paste layer and the negative-electrode collector paste layer are projected to different end surfaces of the laminated block.

Also, there may be mentioned a process for preparing an all solid state secondary battery containing the following steps (1') to (4'):

(1') a step of preparing calcined powder of a positive active material, calcined powder of a negative active material and calcined powder of an ion-conductive inorganic-material by making a calcination temperature of the ion-conductive inorganic-material higher than calcination temperatures of the positive active material and the negative active material;

(2') a step of preparing a positive-electrode paste containing calcined powder of a positive active material, a negative-electrode paste containing calcined powder of a negative active material, an ion-conductive inorganic-material paste containing calcined powder of an ion-conductive inorganic-material, a positive-electrode collector paste containing powder of a positive-electrode collector and a negative-electrode collector paste containing powder of a negative-electrode collector;

(3') a step of obtaining a laminated block by coating pastes on a substrate in the order of the positive-electrode paste, the positive-electrode collector paste, the positive-electrode paste, the ion-conductive inorganic-material paste, the negative-electrode paste, the negative-electrode collector paste, the negative-electrode paste and the ion-conductive inorganic-material paste, and so as to project a positive-electrode collector paste layer and a negative-electrode collector paste layer to different portions of the end surfaces of the laminated block, and drying the block, if necessary; and (4') a step of obtaining a laminated material by peeling the substrate from the laminated block, if necessary, and 35 subjecting to co-firing.

It is preferred that coating is carried out so that the positive-electrode collector paste layer and the negative-electrode collector paste layer are at least projected to different end surfaces of the laminated block.

In either of the above-mentioned preparation processes, if desired, to form a protective layer, for example, an ion-conductive inorganic-material paste layer is provided at either one of the upper end and the lower end of the laminated material block or at the both ends thereof, and then, the material is subjected to co-firing.

The co-firing can be carried out in the air, and, for example, a sintering temperature can be made at 900 to 1100° C. for 1 to 3 hours. By sintering such a temperature, each layer is in a sintered state, and an interface of the adjacent layers can be made in a sintered state. This means that the portion between particles of each layer formed by calcined powder particles is in a sintered state, and the portion between particles of the layers adjacent to each other is also in a sintered state.

Also, the extracting electrode can be provided, for example, by coating a extracting electrode paste containing conductive powder (for example, Ag powder), glass flit, vehicle, etc., on a positive-electrode collector layer and a negative-electrode collector layer projected at the end surface of the laminated material, and then, sintering it at a temperature of 600 to 900° C.

EXAMPLES

In the following, the present invention is explained in detail by referring to Examples, but the present invention is not limited by these Examples. Indication of part(s) means part(s) by weight otherwise specifically mentioned.

Example 1

Preparation of Positive-Electrode Paste

As the positive active material, $LiMn_2O_4$ prepared by the following method was used.

$Li_2CO_3$ and $MnCO_3$ were used as starting materials, and they were weighed with a molar ratio of 1:4, subjected to wet mixing by a ball mill using water as a dispersing medium for 16 hours, and then, dehydrated and dried. The obtained powder was calcined in air at 800° C. for 2 hours. The calcined product was roughly pulverized, subjected to wet mixing by a ball mill using water as a dispersing medium for 16 hours, and then, dehydrated and dried to obtain calcined powder of a positive active material. An average particle diameter of the calcined powder was 0.30 μm. Also, the composition is to be $LiMn_2O_4$ was confirmed by using an X-ray diffraction device.

As a positive-electrode paste, to 100 parts of the calcined powder of a positive active material were added 15 parts of ethyl cellulose as a binder and 65 parts of dihydroterpineol as a solvent, and the mixture was kneaded and dispersed by a triple roll mill to prepare a positive-electrode paste.

(Preparation of Negative-Electrode Paste)

As the negative active material, $Li_{4/3}Ti_{5/3}O_4$ prepared by the following method was used.

$Li_2CO_3$ and $MnCO_3$ were used as starting materials, and they were weighed with a molar ratio of 2:5, subjected to wet mixing by a ball mill using water as a dispersing medium for 16 hours, and then, dehydrated and dried. The obtained powder was calcined in air at 800° C. for 2 hours. The calcined product was roughly pulverized, subjected to wet mixing by a ball mill using water as a dispersing medium for 16 hours, and then, dehydrated and dried to obtain calcined powder of a negative active material. An average particle diameter of the calcined powder was 0.32 μm. Also, the composition is to be $Li_{4/3}Ti_{5/3}O_4$ was confirmed by using an X-ray diffraction device.

To 100 parts of the calcined powder of the negative active material were added 15 parts of ethyl cellulose as a binder and 65 parts of dihydroterpineol as a solvent, and the mixture was kneaded and dispersed by a triple roll mill to prepare a negative-electrode paste.

(Preparation of Ion-Conductive Inorganic-Material Sheet)

As the ion-conductive inorganic-material, $Li_{3.5}SiO_{0.5}P_{0.5}O_4$ prepared by the following method was used.

$Li_2CO_3$, $SiO_2$ and commercially available $Li_3PO_4$ were used as starting materials, and they were weighed with a molar ratio of 2:1:1, subjected to wet mixing by a ball mill using water as a dispersing medium for 16 hours, and then, dehydrated and dried. The obtained powder was calcined in air at 950° C. for 2 hours. The calcined product was roughly pulverized, subjected to wet mixing by a ball mill using water as a dispersing medium for 16 hours, and then, dehydrated and dried to obtain calcined powder of an ion-conductive inorganic-material. An average particle diameter of the calcined powder was 0.54 μm. Also, the composition is to be $Li_{3.5}Si_{0.5}P_{0.5}O_4$ was confirmed by using an X-ray diffraction device.

Then, to 100 parts of the calcined powder of the ion-conductive inorganic-material were added 100 parts of ethanol and 200 parts of toluene in a ball mill to carry out wet mixing, thereafter 16 parts of a polyvinyl butyral series binder and 4.8 parts of benzyl butyl phthalate were further added to the mixture and the mixture was mixed to prepare an ion-conductive inorganic-material paste. This ion-conductive inorganic-material paste was subjected to sheet molding using a PET film as a substrate by the doctor-blade method to obtain an ion-conductive inorganic-material sheet with a thickness of 13 μm.

(Preparation of Collector Paste)

By using 100 parts of Ag/Pd with a weight ratio of 70/30, 10 parts of ethyl cellulose as a binder and 50 parts of dihydroterpineol as a solvent were added to the powder, and the mixture was kneaded and dispersed by a triple roll mill to prepare a collector paste. Here, as the Ag/Pd with a weight ratio of 70/30, a mixed material of Ag powder (average particle diameter: 0.3 μm) and Pd powder (average particle diameter: 1.0 μm) was used.

(Preparation of Extracting Electrode Paste)

100 parts of Ag powder and 5 parts of glass flit were mixed, and 10 parts of ethyl cellulose as a binder and 60 parts of dihydroterpineol as a solvent were added to the mixture, and the mixture was kneaded and dispersed by a triple roll mill to prepare an extracting electrode paste.

By using these pastes, an all solid state secondary battery was prepared by the following manner.

(Preparation of Positive-Electrode Unit)

On the above-mentioned ion-conductive inorganic-material sheet, the positive-electrode paste was printed by the screen printing with a thickness of 8 μm. Next, the printed positive-electrode paste was dried at 80 to 100° C. for 5 to 10 minutes, and the collector paste was printed thereon by the screen printing with a thickness of 5 μm. Next, the printed collector paste was dried at 80 to 100° C. for 5 to 10 minutes, and the positive-electrode paste printed thereon again by the screen printing with a thickness of 8 μm. The printed positive-electrode paste was dried at 80 to 100° C. for 5 to 10 minutes, and then, the PET film was peeled off. According to the procedure, a sheet of the positive-electrode unit in which the positive-electrode paste, the collector paste and the positive-electrode paste had been printed and dried on the ion-conductive inorganic-material sheet in this order was obtained.

(Preparation of Negative-Electrode Unit)

A negative-electrode paste was printed on the above-mentioned ion-conductive inorganic-material sheet with a thickness of 8 μm by screen printing. Next, the printed negative-electrode paste was dried at 80 to 100° C. for 5 to 10 minutes, and a collector paste was printed thereon with a thickness of 5 μm by screen printing. Next, the printed collector paste was dried at 80 to 100° C. for 5 to 10 minutes, and a negative-electrode paste was printed thereon again with a thickness of 8 μm by screen printing. The printed negative-electrode paste was dried at 80 to 100° C. for 5 to 10 minutes, and then the PET film was peeled off. Thus, a sheet of a negative-electrode unit in which the negative-electrode paste, the collector paste and the negative-electrode paste have been printed in this order on the ion-conductive inorganic-material sheet and dried was obtained.

(Preparation of Laminated Material)

Each 5 units of the positive-electrode units and the negative-electrode units were alternately laminated so as to each interposing an ion-conductive inorganic-material. At this time, the positive-electrode unit and the negative-electrode unit were laminated by shifting to each other so that a collector paste layer of the positive-electrode unit is projected only to one end surface, and a collector paste layer of the negative-electrode unit is projected only to the other end surface. Thereafter, the laminated material was molded at a temperature of 80° C. and a pressure of 1000 kgf/cm² [98 MPa], then, cut to prepare a laminated block. Thereafter, the laminated block was subjected to co-firing to obtain a laminated material. The co-firing was carried out by elevating a temperature in air with a temperature elevation rate of 200° C./hr to 1000° C., maintained at the temperature for 2 hours, and after sintering, it was naturally cooled. The thus obtained laminated material after sintering had a thickness of each ion-conductive inorganic-material layer of 7 μm, a thickness of each positive active material layer of 5 μm, a thickness of each negative active material layer of 5 μm, and a thickness of collector layer of 3 μm. Also, a length, width and height of the laminated material were 8 mm×8 mm×0.2 mm, respectively.

(Formation of Extracting Electrode)

An extracting electrode paste was coated at the end surface of the laminated material, and sintered at 750° C. to form a pair of extracting electrodes to obtain an all solid state secondary battery.

(Evaluation)

Lead wires were attached to the respective extracting electrodes connected to the positive-electrode collector and the negative-electrode collector, and repeated charge-discharge test was carried out. The measurement conditions were set that a current at the time of charging and discharging was each 40 μA, a truncation voltage at the time of charging and discharging were each 3.5V and 0.3V, and a charge-discharge time was within 300 minutes. The results are shown in FIG. 5.

Figure 5:
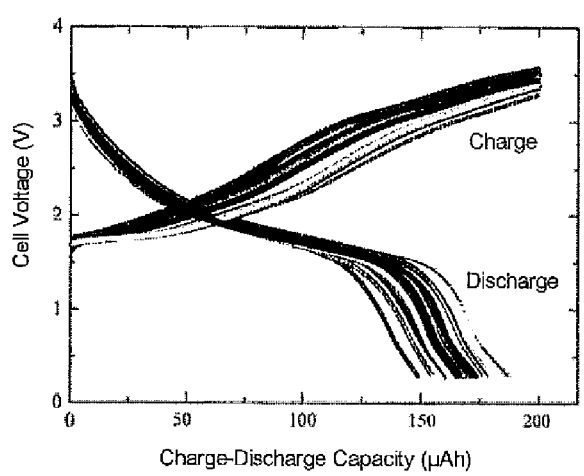
FIG. 5 It is a figure showing repeated charge-discharge characteristics of the all solid state secondary battery of the present invention.
Figure 6:
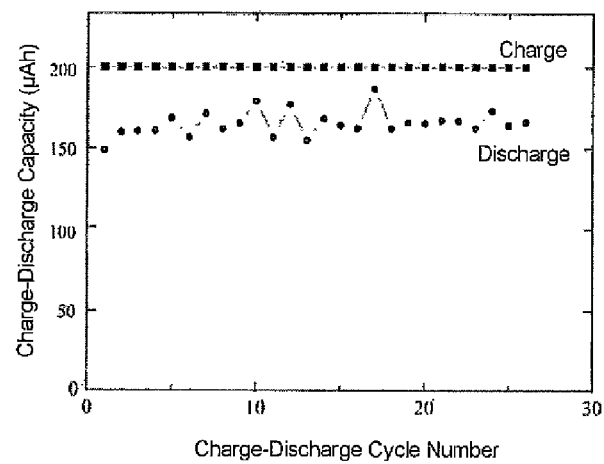
FIG. 6 It is a figure showing a charge-discharge capacity accompanying repeated charge-discharge cycle of the all solid state secondary battery of the present invention.

As shown in FIG. 5, the all solid state secondary battery of the present invention showed excellent repeated charge-discharge characteristics and it can be understood that they have excellent functions as a secondary battery. Also, as shown in FIG. 6, with regard to the charge-discharge capacity, fluctuation could be found at the 17th cycle, and thereafter it became stable to show a substantially constant curve. A discharge initiation voltage at the 18th cycle at which charge-discharge became stable was 3.2V, and a charge capacity and a discharge capacity were 200 μAh and 160 μAh, respectively.

Comparative Example 1

By using the same positive-electrode paste, negative-electrode paste, ion-conductive inorganic-material paste and collector paste as in Example 1, one paste was coated on an alumina substrate and sintered, then a next paste was coated and sintered and this procedure was repeated to try to prepare a wholly solid battery so as to have the same parallel structure as in Example 1. The sintering temperatures were the same temperatures as in Example 1.

However, the ion-conductive inorganic-material paste was coated on the alumina substrate and sintered, and on the obtained ion-conductive inorganic-material layer was coated the positive-electrode paste and sintered, then the ion-conductive inorganic-material layer and the positive active material layer were markedly peeled off. Thus, the next step could not be carried out and an all solid state secondary battery having the same parallel structure as in Example 1 could not be prepared This is because, in the second sintering, the ion-conductive inorganic-material layer which had been once subjected to sintering did not shrink any more, whereas the positive active material layer which was to carry out a first sintering shrunk whereby behaviors were different between the layers so that crack or peeling would be considered to be caused. Also, when the method as in Comparative example 1 is employed, it is necessary to sinter in each step so that production efficiency is extremely bad.

Example 2

In the same manner as in Example 1 except for changing the calcination temperature to a temperature as shown in Table 1, the positive active material, the negative active material and the calcined powder of an ion-conductive inorganic-material were obtained. With regard to each calcined powder, a linear shrinkage rate was measured as follows. The results are shown in Table 1.

(1) Powder which is an object to be measured was pressed with 0.5 t/cm² [49 MPa] to prepare a test piece with a thickness of 0.8 to 1.2 mm, and cut to prepare a test piece having a length of 1.5 mm, a width of 1.5 mm and a thickness of 0.8 to 1.2 mm.

(2) By using a thermal analyzer (manufactured by Mac-Science Co., Ltd.), change in thickness after heating to a predetermined temperature was measured while applying a load of 0.44 g/mm² to the test piece according to the thermomechanical analysis method.

(3) The measured value was substituted to the following equation to obtain a linear shrinkage rate.

$$\text{Linear shrinkage rate } [\%] = \frac{\text{Initial thickness} - \text{Thickness after heating to predetermined temperature}}{\text{Initial thickness}} \times 100$$

TABLE 1

| Calcination temperature [° C.] | Positive-electrode active-substance Linear shrinkage rate a [%] | Negative-electrode active-substance Linear shrinkage rate b [%] | Ion conductive inorganic material Linear shrinkage rate c [%] |
|---|---|---|---|
| 700 | 10.0 | 10.0 | 18.0 |
| 800 | 8.0 | 8.0 | 16.5 |
| 900 | 5.5 | 5.5 | 16.0 |
| 950 | 5.0 | 4.5 | 14.0 |
| 1000 | 4.0 | 2.5 | 12.0 |

Calcined powders of the positive active material, the negative active material and the ion-conductive inorganic-material with various calcination temperatures were combined to prepare batteries in the same manner as in Example 1, and occurrence of crack or peeling were observed. The results are shown in Table 2.

TABLE 2

| Example | Positive-electrode active-substance Calcination temperature (° C.) | Positive-electrode active-substance Linear shrinkage rate (%) | Negative-electrode active-substance Calcination temperature (° C.) | Negative-electrode active-substance Linear shrinkage rate (%) | Ion conductive inorganic material Calcination temperature (° C.) | Ion conductive inorganic material Linear shrinkage rate (%) | Difference in Linear shrinkage rate (Maximum value - minimum value) (%) | Presence or absence of crack or peeling |
|---|---|---|---|---|---|---|---|---|
| 2-1 | 800 | 8.0 | 800 | 8.0 | 950 | 14.0 | 6.0 | None |
| 2-2 | 700 | 10.0 | 700 | 10.0 | 950 | 14.0 | 4.0 | None |
| 2-3 | 700 | 10.0 | 800 | 8.0 | 950 | 14.0 | 6.0 | None |
| 2-4 | 800 | 8.0 | 700 | 10.0 | 950 | 14.0 | 6.0 | None |
| 2-5 | 800 | 8.0 | 800 | 8.0 | 900 | 16.0 | 8.0 | None |
| 2-6 | 800 | 8.0 | 800 | 8.0 | 1000 | 12.0 | 4.0 | None |
| 2-7 | 700 | 10.0 | 700 | 10.0 | 900 | 16.0 | 6.0 | None |
| 2-8 | 700 | 10.0 | 700 | 10.0 | 1000 | 12.0 | 2.0 | None |
| 2-9 | 900 | 5.5 | 900 | 5.5 | 900 | 16.0 | 10.5 | Present |
| 2-10 | 900 | 5.5 | 900 | 5.5 | 1000 | 12.0 | 6.5 | Present |

This is an all solid state secondary battery which uses a combination of a positive active material and a negative active material with a calcination temperature of 700 to 800° C., and an ion-conductive inorganic-material with a calcination temperature of 900 to 1000° C., and when linear shrinkage rates a, b and c with a difference between the maximum value and the minimum value within 6%, it could be confirmed that no occurrence of crack and peeling, and it works extremely good as a battery.

INDUSTRIAL UTILIZABILITY

The present invention is as mentioned above, an all solid state secondary battery with a structure in which parallel connection can be done simply and easily, and by more laminating a number of lamination, charge capacity and discharge capacity can be made larger, so that it is an invention which can be utilized in industry with a great extent.

The invention claimed is:

1. An all solid state secondary battery which comprises a laminated material in which a positive-electrode unit and a negative-electrode unit are alternately laminated through an ion-conductive inorganic-material layer,
wherein the positive-electrode unit has positive active material layers on both surfaces of a positive-electrode collector layer, the above-mentioned negative-electrode unit has negative active material layers on both surfaces of a negative-electrode collector layer,
wherein the laminated material comprises the positive active material layer formed from a calcined powder as a starting material, the negative active material layer formed from a calcined powder as a starting material, and the ion-conductive inorganic-material layer formed from a calcined powder as a starting material,
wherein the positive active material layer comprises a lithium compound selected from the group consisting of $LiCoO_2$, $LiNiO_2$, $LiMnO_2$, $LiMn_2O_4$, $LiCuO_2$, $LiCoVO_4$, $LiMnCoO_4$, $LiCoPO_4$ and $LiFePO_4$,
wherein the negative active material layer comprises a lithium compound selected from the group consisting of $Li_{4/3}Ti_{5/3}O_4$, $LiTiO_2$ and $LiM1_sM2_tO_u$ wherein M1 and M2 are transition metals, s, t and u are optional positive numbers,
wherein the difference between a maximum value and a minimum value of a linear shrinkage rate, defined as (an initial thickness−thickness after heating to a temperature of the co-firing while applying a load of 0.44 g/mm$^2$)/initial thickness×100, of the calcined powder of the positive active material, the calcined powder of the negative active material, and the calcined powder of the ion-conductive inorganic material is within 6%.

2. The all solid state secondary battery according to claim 1, wherein at least one of the positive-electrode collector layer and the negative-electrode collector layer comprises any of a metal of Ag, Pd, Au and Pt, or an alloy containing any of Ag, Pd, Au and Pt, or a mixture of two or more kinds selected from these metals and alloys.

* * * * *